US005606231A

United States Patent [19]

Kröger et al.

[11] Patent Number: 5,606,231

[45] Date of Patent: Feb. 25, 1997

[54] VIBRATING TABLE FOR MASSES TO BE COMPACTED AND A VIBRATORY METHOD OF COMPACTION FOR THE COMPACTION OF CONCRETE

[75] Inventors: Dietrich Kröger, Wiesbaden; Arnim Bura, Saulheim, both of Germany

[73] Assignee: Netter GmbH, Mainz-Kastel, Germany

[21] Appl. No.: 348,606

[22] Filed: Dec. 2, 1994

[30] Foreign Application Priority Data

Dec. 4, 1993 [DE] Germany .......................... 43 41 387.0

[51] Int. Cl.$^6$ .................................. B28B 1/00; H02P 5/46

[52] U.S. Cl. ............................ 318/67; 425/456; 425/421

[58] Field of Search .................................... 425/421, 422, 425/420, 419, 423, 424, 456, 78, 432; 318/67, 66, 34, 53, 59; 248/559

[56] References Cited

U.S. PATENT DOCUMENTS

| | | | |
|---|---|---|---|
| 2,700,810 | 2/1955 | Garni . | |
| 3,528,144 | 9/1970 | Haponski . | |
| 3,792,617 | 2/1974 | Strasser et al. . | |
| 3,830,607 | 8/1974 | Baxendale et al. | 425/424 |
| 4,063,959 | 12/1977 | Halle et al. | 425/422 |
| 4,131,670 | 12/1978 | Abate | 425/219 |
| 4,193,754 | 3/1980 | Sekiguchi | 425/253 |
| 4,796,685 | 1/1989 | Hanneton et al. . | |
| 4,830,597 | 5/1989 | Steier et al. . | |
| 4,978,488 | 12/1990 | Wallace . | |
| 5,135,384 | 8/1992 | Redwine . | |
| 5,277,853 | 1/1994 | Allison et al. | 425/421 |
| 5,355,732 | 10/1994 | Anderl et al. . | |
| 5,395,228 | 3/1995 | Aeseth et al. | 425/253 |

FOREIGN PATENT DOCUMENTS

| | | |
|---|---|---|
| 19061952 | 3/1967 | Germany . |
| 3801835A1 | 1/1988 | Germany . |
| 9116884 U | 11/1991 | Germany . |
| 9115834 U | 12/1991 | Germany . |
| 9210789 U | 12/1992 | Germany . |
| 41038565 | 5/1993 | Germany . |
| WO91/17874 | 11/1991 | WIPO . |

OTHER PUBLICATIONS

Publication in Concrete Precasting Plan and Technology, Issue Feb. 1993, entitled Vibrationssystem von Skako–Imac, pp. 120–121.

*Primary Examiner*—John W. Cabeca
*Attorney, Agent, or Firm*—Lee, Mann, Smith, McWilliams, Sweeney & Ohlson

[57] ABSTRACT

A vibrating table for compaction of a mass such as concrete. The vibrating table includes a table top adapted to support the mass to be compacted. Support members support the table top above a floor and provide the table top with two degrees of freedom of movement in a principal plane which is substantially horizontal. The support members rigidly support the table top against movement in a generally vertical direction. An excitation shaft is coupled to the table top and has an axis of rotation which is generally perpendicular to the horizontal principal plane. The excitation shaft includes an unbalanced mass for the creation of an excitation force which provides movement of the table top in the horizontal principal plane.

21 Claims, 3 Drawing Sheets

VIBRATING TABLE FOR MASSES TO BE COMPACTED AND A VIBRATORY METHOD OF COMPACTION FOR THE COMPACTION OF CONCRETE

BACKGROUND OF THE INVENTION

The invention relates to a vibrating table for compacting masses by vibration—in particular, concrete—whose principal plane in operation is arranged largely horizontally, and which carries a mold, containing a mass to be compacted, and on which is supported a driven (exciting) shaft, that is provided with at least one unbalanced mass for the creation of an excitation force.

Here, by vibrating table is to be understood, within the meaning of the invention under consideration, not only a table in the classical sense of the word, i.e. a device possessing a continuous table top, but also to be understood by this term are all those structural shapes using the mold containing the concrete to be compacted as a component part of the vibrating table. Thus, for example, there are vibrating tables known that possess only one frame, resting on columns, to carry the mold, or that manage completely without frames and require an appropriately rigid mold, which is supported on two stands, or such like. The concept of vibrating table, within the meaning of invention now under consideration, should, therefore, include in general all devices suitable to vibrate a mold that is placed atop them. Furthermore, the invention relates to a process for compacting concrete.

In many fields of technology it is necessary to compact masses held in containers. Here, for example, we might be dealing with bulk goods whose volume is to be reduced; in particular, however, this machine requirement is present when concrete must be poured into molds for the production of prefabricated compound units. In order to obtain high strength values, it is absolutely necessary to achieve high compaction before the concrete sets. In ready-mix cement plants various processes and devices are utilized to compact fluid concrete, and essentially they are all based on the fundamental concept of impressing the mold containing the cement to be compacted using an oscillating or rotating motion, which results in shearing strain in the cement. In this manner the cement is deaerated, and the cement correspondingly compacted.

The method of impressing the liquid cement with a motion over the mold walls is called jolting, vibrating, or shaking. The devices used to accomplish this are called, depending upon the chief frequency range and oscillation amplitude utilized, vibrating tables or vibrating girders, and, from time to time, also called jolting tables. Within the meaning of this invention, these terms shall be understood as synonyms, i.e., within the meaning of the invention the sole decisive point is that a recurrent motion runs through a container holding a mass to be compacted, in particular a mold that contains concrete.

The vibrating tables used in concrete factories operate either with so-called unbalanced exciters, in which a rotating unbalanced mass produces an excitation force, which in turn causes the table top and the mold mounted atop it to vibrate, or with linear drives, as, for example, in hydraulic cylinders, or the like, which are operated periodically with a corresponding control. Known and generally utilized unbalanced exciters consist of a shaft, onto which a weight is attached eccentrically, and which is mounted on a vibrating table. The shaft is driven either with electric, pneumatic, or hydraulic power, but can also be driven using V belts, or the like.

What has gained acceptance as state of the art in the linear drives is to compact by vibration in two directions, perpendicular to each other on the table plane, i.e., on the horizontal. For this reason two hydraulic cylinders with a controlling device, two thrust crank assemblies, or the like, are necessary. The vibrating motion is performed consecutively in time, i.e., first, for example, it is vibrated in the direction of the X-axis, and then in the direction of the Y-axis. The vibrating tables operating and/or excited in the horizontal plane are also known as horizontal vibrating tables. A paper regarding optimum vibration parameters for such vibrating tables and the obtainable compaction results can be found in *Bauzeitung* 1973, 10th volume, pages 510 ff.

In order to obtain the required compression in the concrete masses compacted utilizing horizontal vibrating tables, it is necessary to produce waves possessing a high density of energy in the fluid concrete mass. Here the majority of the state of the art vibrating tables are excited using high frequencies, since the density of energy is proportional to the square of frequency. The generally utilized frequency range lies from 25 to 300 Hz, i.e., within the range of audibility. Therefore, there is a loud noise produced, posing a health hazard for those working in the concrete plants. Therefore, great efforts have been undertaken to achieve the same compression effect, but using a frequency range under 15 Hz, i.e., a frequency range that can scarcely be detected by the human ear. Thus, for example, devices have been built that operate in the range from 3 to 10 Hz. However, in order to achieve the minimum acceleration required for concrete compaction, to balance the lower frequencies, higher amplitudes are required—for example, at a frequency of 5 Hz, an amplitude of 5–6 mm is required. Since the concrete prefabricated compound units, and thus the total mass of the form holding the liquid concrete, are very large, for example, in the range of 10–20 t, the creation of such parameters is difficult, due to the high forces that must be introduced.

In addition there exist vibrating tables in which the mold, that is atop the table surface and that contains the concrete to be compacted, is vibrated vertically. Here, this can lead to jarring blows when molds are used that are merely frictionally connected to the table, if, namely, the acceleration of the mold is greater than 1 g. In molds that are form-locked with the table, jarring blows can indeed be avoided. However, to obtain good compression effects, high frequencies are required, which, with the already described considerable noise nuisance and health hazards, are all part of the job for those working in the concrete plants.

Printed specification of German patent (DE-PS) 4 116 647 describes a vibrating device, which is supplied with four horizontally placed excitation shafts, each with a weight provided eccentrically, i.e., supplied with an unbalanced mass. Each of the four excitation shafts has its own drive, which is connected to a control device. One of the four drives operates as a master drive, and the phase relationship of the unbalanced masses of the three other drives is controlled in relation to the first drive, so that via the superposition of the centrifugal forces of the total four circulating unbalanced masses, a resulting excitation force vertical direction (Z-axis) can be created, whose amplitude can be affected relative to one another by regulating the phase relationship of at least two circulating unbalanced masses.

A disadvantage of this embodiment is the relatively high structural costs, which are solely utilized to create an excitation force in one direction and are consequently merely a vibration pattern, which leads to partially unsatisfactory compacting results.

While the vertically operating vibrating tables are inferior to the horizontally operating vibrating tables as regards noise development, the hitherto known horizontal vibrating process is encumbered by the disadvantage that compacting time is greater than in the vertical process and/or vibrating tables.

Therefore, the invention is based upon the object of designing a horizontal vibrating table that will allow a high compression effect within a short period of time, and that has a low noise nuisance, and which is characterized by a simple structural design. In addition, the invention is based upon the object of further developing a horizontal vibrating table whereby, depending upon the specifications, a plurality of vibration modes are possible, in order to favor a good compression of concrete and/or other masses to be compacted. In this connection, the basic idea, as foreseen in the invention, sees as a solution in a horizontal vibrating table, in accordance with its class, that at least one excitation shaft shall be provided vertically.

Also, in a preferred embodiment of the invention several, for example, two or four, excitation shafts could be provided on the vibrating table, symmetrical to each other with respect to rotation.

In general, with this basic idea, in accordance with the invention, i.e., to provide vertically placed excitation shafts with unbalanced masses, we are confronted with the problem that, due to the rotating masses, a shifting of the center of gravity of the total system occurs, which produces moments around the Y-axis or the X-axis, which in turn causes the appearance of vertical amplitudes. A disadvantage of the vertical vibration created by said moments is, in particular, that here we are dealing with torsional vibration around the X-axis or Y-axis, whereby in the nature of things the vertical amplitudes in the outer zone of the mold are greater than in the center of gravity -and/or in axial proximity, which leads to the fact that the compression effect in the outer zone of the mold is relatively good, but insufficient in the proximity of the center of gravity or the axes.

With the appearance of vertical vibration components, in addition to the non-uniform compression effect, there is to a large extent the additional serious problem that the natural frequency of the total system in the vertical direction can lie so close to the excitation frequencies that the total system, consisting of vibrating table, mounted mold with concrete for compacting, and the total weight of the excitation shafts, can be caused to be in resonance, whereby the resulting large amplitudes can then slosh the concrete out of the mold, and cause damage to the vibrating table.

Therefore, as regards its part as a device, as part of the object, to a large extent, the invention is based upon the object of designing a horizontal vibrating table with vertically placed excitation shafts, in accordance with the invention, so that the said vibrations will be suppressed by the vertical vibration components.

Viewed in terms of vibration technology, this part of the object is comparable to the task of designing the total system, consisting of horizontal vibrating table, mounted mold that contains concrete to be compacted, and vertically placed shafts on the vibrating table, in such a way that, in the vertical direction, no resonances occur with the frequencies under consideration, i.e., in the frequency range below the threshold of audibility.

The solution to the second part of the object with the vibrating table, in accordance with its class, fitted with vertically situated excitation shaft(s), in accordance with the invention, is characterized in that the table is supported in such a fashion that it possesses in the principal plane two degrees of freedom (X-, Y-direction). However, in the direction of the gravitational force field, it is essentially rigidly supported.

In regard to the part in accordance with the device, the invention is based upon the object of further developing a process to vibrate (shake, vibratory compaction) of concrete in a mold to be compacted, so that the compression effect in comparison to the state of the art is improved, or at least preserved, whereby, however, noise production is diminished, and the process can be performed on a vibrating table that is structurally comparatively simple.

In regard to the procedural part, the invention is characterized in that the mold, which contains the concrete to be compacted, is excited on a vibrating table with circular shaking motions in the horizontal principal plane of the table.

Surprisingly it has been proven that in no way is it necessary to vibrate in directions perpendicular to one another in order to obtain sufficient shearing forces in concrete for a sufficient compression effect. A uniform and circular motion to create shearing strain in the concrete to be compacted is sufficient to obtain the desired sufficient compression of the concrete.

SUMMARY OF THE INVENTION

In a preferred embodiment of a vibrating table, in accordance with the invention, the vibrating table possesses precisely one excitation shaft, which is situated under the vibrating table's center of gravity. This embodiment is characterized by its simple design, and allows the performance of the method of vibration and/or compaction of concrete, in accordance with the invention, namely the induction of a circular vibration of the mold that contains concrete to be compacted. Preferably such a table, and/or the single vertically situated excitation shaft, will be operated at a frequency from 0–10 Hz, i.e., in the range of the faintly audible or inaudible frequencies.

Provided in accordance with the invention—in order for the practical realization of the support of the vibrating table, in accordance with the invention, i.e., with two degrees of freedom (X-axis, Y-axis), perpendicular to one another, in the primary plane, however, a largely rigid support in the direction of the gravitational force field (Z-axis) —is the use of at least three, preferably, however, four or more single-valued supports, which preferably are arranged symmetrical to each other with respect to rotation.

By single-valued support it is understood that forces can transduce only in the direction of a line of action and, however, cannot transduce any bearing forces in other planes. Such single-valued supports are preferably designed in the form of tension elements, which, in a particularly simple embodiment are cables. For example, these cables can be fixed at a minimum of three points, preferably, however, at four points, of the vibrating table, and for example, can be mounted on the room ceiling of the respective factory space. This design and/or embodiment of the single-valued supports is, however, encumbered with disadvantages, insofar as the space that is available above the vibrating table is used, and thus free passage to other production facilities, stock-feeding paths, is hindered.

Therefore, in a particularly preferred embodiment it is preferably provided that the vibrating table be situated over a pit sunk in a factory floor, and that the support and at least one vertical excitation shaft is located below the table plane, in the pit. In this fashion, compared to the last described embodiment, a compact and space-saving design of vibrating table and control mounting as well as drive is realized.

Furthermore, it can be provided that the unbalanced mass weight is made up of two unbalanced mass weights, which are designed with cross sections that are circular sector-shaped, and one of which is rotatable on the excitation shaft, and which is pulled along via a follower pin situated on the other unbalanced mass. The follower pin, at the same time, runs in a groove, so that, depending on the direction of rotation of the excitation shaft, various overlapping angles result for the two unbalanced masses, with cross sections of circular sector-shape. With greater overlapping, the unbalanced mass is correspondingly larger, so that at a certain revolution per minute of the excitation shaft, a great centrifugal force, and thus excitation force, is produced. In this fashion, two different excitation moments at equal revolutions per minute can be realized, which is advantageous, if, for example, concrete preforms are poured in several layers. With vibratory compaction and/or jolting of the first applied layer, then a lower moment, i.e., a smaller excitation force is used when vibrating than when applying the second concrete layer, which increases the total mass of the system correspondingly.

In such a design, with a vibrating table located over a pit, the supports, which are preferably constructed in the four corner zones of the vibrating table, are arranged in such a fashion that mounting brackets are provided, which are essentially L-shaped and extend downwards from the underside of the vibrating table; and that the essentially L-shaped girders, extending from the pit floor upwards, are designed in such a fashion that the short (transverse) legs of the L-shaped mounting brackets each have a short (transverse) leg, which is provided with an L-shaped girder, arranged in an overlapping fashion, extending from the underside of the vibrating table; and that the single-valued supports are designed in the form of elements that transduce tensile forces, and that are each vertically spanned between two overlapping (transverse) legs.

Through this embodiment, in accordance with the invention, with comparatively simple structural measures, a vibrating table is created with which heavy concrete masses can be effectively compacted at low frequencies, without the occurrence of a noise nuisance, and without the shifts of the center of gravity of the perpendicular excitation shafts producing perpendicular vibration components and/or torsional vibration around the X- and Y- axes, which can lead to resonances, and thus to a malfunction of the entire system.

Preferably, it is provided that the elements that transduce the tensile forces, are tension test bars. In comparison with cables, likewise possible as tension elements, the tension test bars have the advantage that when under compression stress they also exhibit a certain inherent rigidity, whereby the resonance frequency of the entire system in the perpendicular direction is shifted further upwards, i.e., from the preferred operating range below the threshold of audibility, beyond the preferred range of the excitation frequency.

In addition, the recommended control mounting has the advantage that it is insensitive to the ever-present abrasive rock dust in the concrete plant.

On the other hand, the device, in accordance with the invention, can be carried out with other single-value supports, too, for example, such as friction bearings or ball bearings.

A alternative control mounting, in accordance with the invention, provides that each control mounting consists of a column layout made of elastomeric material, place perpendicular in the pit, provided on the underside of the vibrating table, designed so compression resistant that the total system, consisting of vibrating table and excitation shafts, exhibits a natural frequency in the perpendicular direction of $\geqq$ 25 Hz. Here, this elastomer design in the direction of X-Y plane acts as hinges through its movability and the columns, so that the desired shaking motion of the table is not hindered in the horizontal plane.

The stability of the elastomeric column layout of the control mounting can be increased even further by providing the central zone with a rigid, non-elastic zone (for example, in the form of tubular columns) with only the upper and lower end zone comprised of a disc made of an elastomeric material.

In addition, it can be considered an advantage that a total of two or four perpendicular unbalanced shafts are arranged symmetrically in terms of rotation. Such a design offers the advantage, on the one hand, that the preferred, circular shaking motion, in accordance with the invention, can be produced easily, in that all two or four unbalanced masses can be operated with the same phase relationship, and, on the other hand, linear vibrational patterns can be produced via phase angles between the two or four unbalanced masses.

Thus, in the operation of four unbalanced mass shafts, arranged symmetrically to one another, in terms of rotation, in the four quadrants of the main table plane subdivided by X- and Y-axis, operation is possible to such an extent that a back and forth motion of the vibrating table in X-direction or Y-direction is created. Furthermore, in a design of four excitation shafts it is also conceivable that at any one time two excitation shafts, which lie diagonally across from each other, are shut down, and that both rotating excitation shafts with a difference phase relationship of the unbalanced masses are operated, so that vibration directions could be achieved that run under a perpendicular angle to the X- or Y-axis.

Preferably, the excitation shafts are driven by three phase A.C. motors, whereby one of the motors is operated as a master drive and the other motors are operated as follower drives, so that the desired difference phase relationship of the unbalanced masses is defined by the rotating unbalanced mass of the master drive.

BRIEF DESCRIPTION OF THE DRAWINGS

Details of the invention shall be provided in the following with one embodiment in the drawing. Presented in the drawing are.

DETAILED DESCRIPTION OF THE PREFERRED EMBODIMENTS

Figure 1:
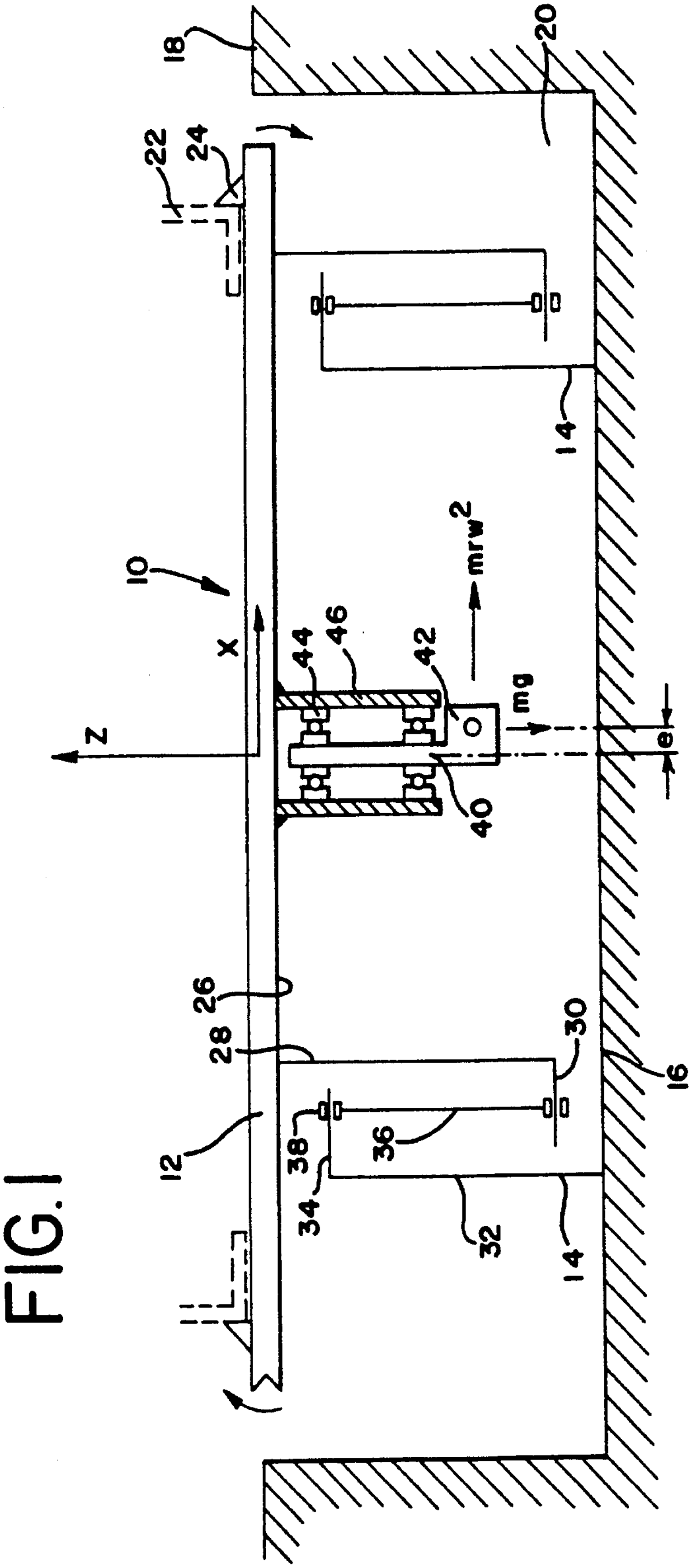
FIG. 1, in schematic representation, a vertical section of a vibrating table in a pit of a factory floor, in accordance with the invention, possessing a vertical excitation shaft located under the center of gravity of the table's principal plane.

FIG. 1 illustrates, in schematic representation, a vertical section of a vibrating table 10, in accordance with the invention, with table top 12, which is held by four supports. Supports 14 stand on floor 16 of a pit 20 sunk into a factory floor 18 or are bolted onto, or attached in another fashion, there.

On table top 12 sits mold 22, schematically indicated using dotted lines, which can be secured in position using a form-locking fastening material 24. Mold 22 contains the concrete to be compacted, which is to be set and made into prefabricated concrete compound units.

Each of the four supports 14 possesses, first of all, an L-shaped mounting bracket 28, extending from the underside 26 of the table top 12 vertically downwards, whose long leg extends vertically downwards. The shorter leg 30 runs level, to the horizontal, i.e., parallel to the floor surface 16 of the pit 20 of the factory floor 18. From the pit floor 16 a likewise L-shaped girder 32 extends vertically upwards, whose short leg 34 is designed in such a fashion that each short (transverse) leg 30 of the mounting bracket 28, that extends from the underside 26 of the vibrating table vertically downwards, and the short (transverse) leg 34 of the girder 32, extending upwards from the pit floor 16 are arranged in an overlapping fashion. Between the two cited (transverse) legs 30 and 34, a tensile force transducing element 36 is spanned, which, for example, can be a suspension cable, or also preferably a tie rod. The tie rod can possess threaded areas on its upper and lower ends with which it can be bolted using nuts 38.

In FIG. 1, in addition, a Cartesian coordinate system is plotted, whereby the X-axis runs to the right in the direction of the drawing plane, while the Y-axis runs perpendicular to the drawing plane. The positive coordinate direction on the Z-axis acts in the opposite direction to the gravitational force field. It is immediately evident that when the vibrating table is at rest each tension element 36 carries a quarter of the total weight, as long as the additional weight of the unbalanced mass of the excitation shaft is not taken into consideration.

Perpendicular, under the center of gravity, i.e., situated in the Z-axis, is an excitation shaft 40, which carries an unbalanced mass 42, which is staggered around an eccentricity e above the Z-axis. The excitation shaft 40 is buttressed by supports 44, which are shored up via a bearing tube 46 and are connected to table top 12. Excitation shaft 40 is operated by a drive, not detailed in FIG. 1, which, for example, can be an electric motor directly connected to the shaft, a belt driver, or such like.

In rotating excitation shafts, the unbalanced mass 42, accelerated on a circular path, produces a centrifugal force $mr\omega^2$, which creates the desired vibratory motion in the X-Y plane. In addition, the unbalanced mass creates an undesired moment m g e, which likewise also rotates. In the arrangement illustrated in FIG. 1, the unbalanced mass 42 creates a static moment of magnitude m g e around the Y-axis, which,in a conventional vibrating table, can lead to a tilting of the table top 12 around the Y-axis, i.e., in the direction indicated by the arrows. Based on the fact that we are dealing with a rotating moment, the moment acting around the Y-axis oscillates periodically, so that there is a danger of resonance. Through supports 14, in accordance with the invention, table top 12 of the vibrating table is so firmly supported against the movement around the Y-axis and X-axis, that the resonance frequencies are so high, that we can consider as essentially rigid the entire vibrating table in the Z-axis, i.e., in the direction of gravitational force field, with the rotational frequencies of the unbalanced masses 40 that come into consideration. At the same time with supports 14, in accordance with the invention, of the vibrating table, in accordance with the invention, it is guaranteed that a vibratory or oscillation motion in the X-Y plane is possible problem-free.

Thus, the vibrating table, in accordance with the invention, allows, for the first time, a circular vibratory motion for the compaction of concrete for prefabricated concrete compound units, which has proven itself as particularly advantageous, since it leads to excellent compaction results, and also low noise nuisance.

Even though, in accordance with the invention, the circular vibratory motion has proven most useful for concrete, it can be desirable under certain circumstances also to produce translatory motions. Considered from this point of view, in FIG. 2 a second embodiment of a vibrating table in accordance with the invention is schematically represented, in which four excitation shafts 40*a*–40*d* are arranged symmetrically to one another in terms of rotation.

Figure 2:
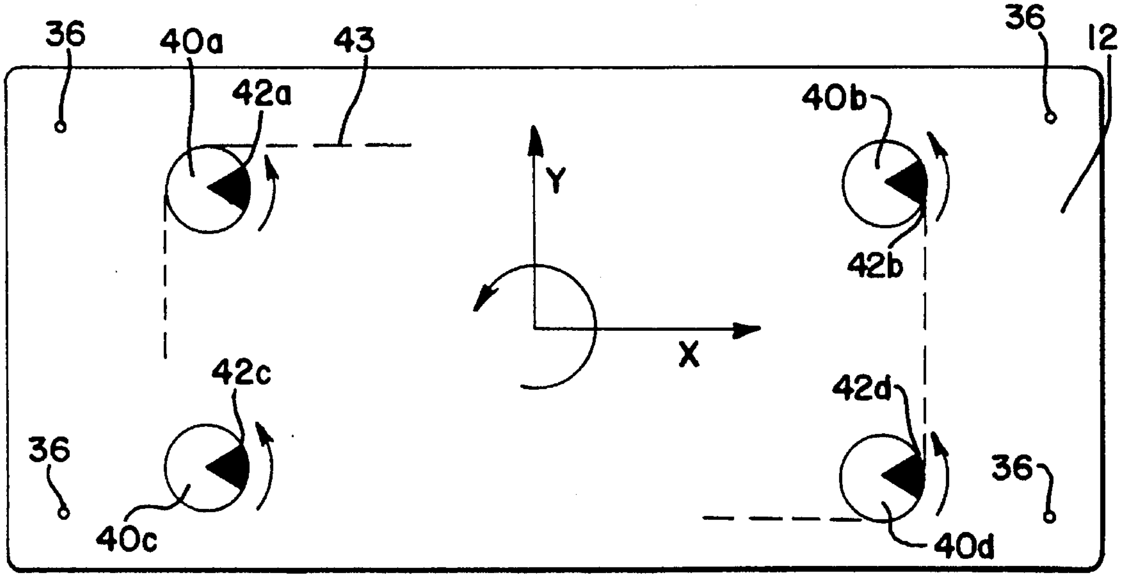
FIG. 2 is a top view of a schematic representation of an alternative embodiment of the vibrating table in FIG. 1 with four excitation shafts, arranged symmetrically to each other in terms of rotation, in schematic representation, whereby the phase relationship of the unbalanced mass is equal for all four shafts.

FIG. 2 represents schematically the table top 12 of the vibrating table as well as the four tension elements 36 of supports 14, which are not detailed further. FIG. 2 also represents schematically the operation of four excitation shafts 40*a*–40*d* for the production of uniform circular vibratory motion, as is made possible using a single, large unbalanced mass in the embodiment illustrated in FIG. 1. The four unbalanced masses 42*a*–42*d* of the four excitation shafts 40*a*–40*d* rotate in this mode of operation with equal phase relationship and direction of rotation. The load case depicted in FIG. 2, in regard to the tension elements 36, therefore essentially appears the same as in FIG. 1, i.e., the center of gravity of the total system is shifted in a positive direction on the X-axis, whereby a positive moment is created around the Y-axis, which essentially is captured by a higher load of the tension elements 36 located on the right side. Thus, torsional vibration around the Y-axis is not produced, since, in accordance with the invention, the embodiment's supports are utilized, as represented by support 14 in FIG. 1.

In accordance with the invention, it is provided that the four excitation shafts are driven by four individual three phase A.C. motors, at the same time it is furthermore provided, in accordance with the invention, that one of the three phase A.C. motors, in the previous case, for example, that of excitation shaft 40*a*, acts as master drive, i.e., that the rotating unbalanced mass 42*a* is seen as a rotating coordinate system upon which the phase difference angle of the other excitation shafts are defined and regulated.

As indicated in FIG. 2 via dotted line 43, in the case that only one circular motion is supposed to be created, a mechanical synchronization of the four excitation shafts in the mold of a rotating toothed belt 43, or such like, can be used in place of synchronization via electric control.

Figure 3:
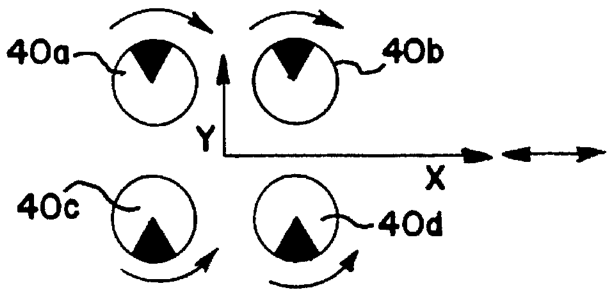
FIG. 3 phase relationship and rotatory direction of four excitation shafts for a translatory excitation on the X-axis.

FIG. 3 illustrates an alternative mode of operation for the four excitation shafts, in which the bottom two excitation shafts 40*c* and 40*d* continue to be operated in the mathematically positive sense of rotation, while the excitation shafts 40*a* and 40*b* rotate in the opposite direction.

In the course of this, at any one time two shafts of a direction of rotation, without phase difference angles, rotate, while between the two shaft pairs a difference angle of π is set. In this fashion, a translatory excitation is created in the direction of the X-axis. If one imagines the unbalanced masses from the arrangement shown in FIG. 3 turned further by an angle of rotation of π/2, then a moment of force is produced around the Y-axis, which corresponds to that depicted in FIG. 2. This, in turn, is shored up by the control mounting, so that the undesired vertical vibration components are not produced by the torsional vibration around the Y-axis.

Figure 4:
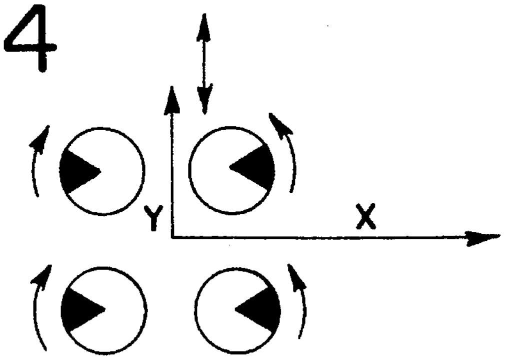
FIG. 4 phase relationship and rotatory direction of four excitation shafts for a translatory excitation on the Y-axis.

FIG. 4 depicts correspondingly the mode of operation of the four excitation shafts for a translatory vibration of the vibrating table, in accordance with the invention, in the Y-axis.

Figure 5:
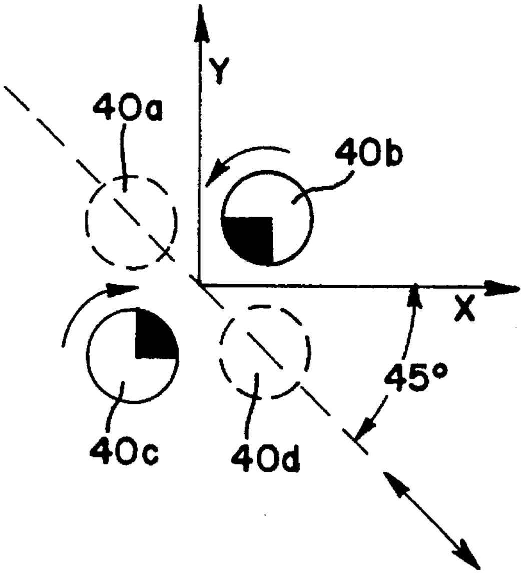
FIG. 5 a schematic representation of phase relationship and rotatory direction of two shafts, diagonal to each other, for a translatory excitation under an angle of 45° to the X- or Y-axis in schematic representation.

As shown in FIG. 5, in addition, the arrangement of four vertical excitation, in accordance with the invention, allows the option of shutting down two diagonally opposed shafts, for example, as schematically depicted in FIG. 5, excitation shafts 40*b* and 40*c* rotate in opposite directions with a phase difference angle of π, so that a translatory excitation, whose transverse line of action runs under a perpendicular angle to the X- and Y-axis results.

Figure 6:
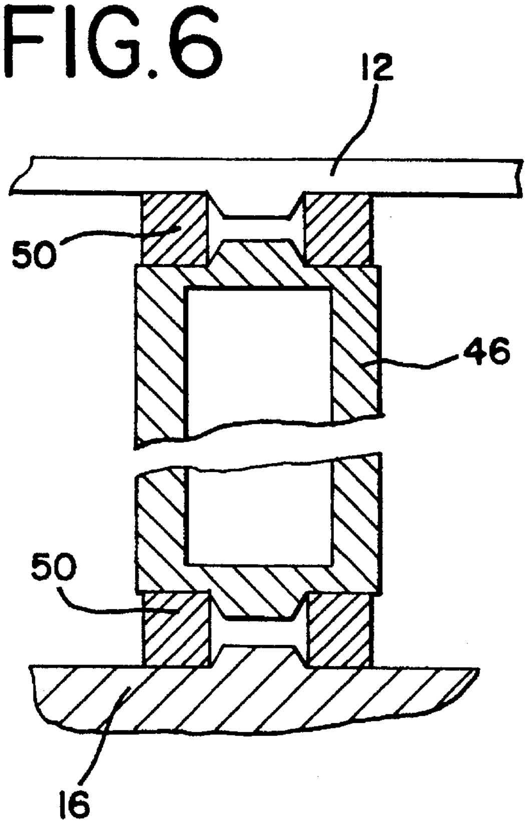
FIG. 6 an alternative embodiment of a support for a vibrating table in accordance with the invention.

FIG. 6 depicts an alternative embodiment for a support for a vibrating table in accordance with the invention. Table top 12 of the vibrating table lies atop tube-shaped columns 48, which stand on the room floor and/or pit floor. An elastomer-disc is placed between each table top 12 and tubular column 48, as well as between each tubular column 48 and the pit floor 16. With vibration in the X-Y-plane the elastomer discs 50 are placed under shearing stress, and thus enable a circular or translatory vibratory motion in the X-Y-plane. In the direction of the Z-axis the elastomer discs are compressed by the weight of the vibrating table 12 and the mold atop it with the concrete to be compacted. With the appropriate selection of hardness, and of diameter, and at a low height of discs 50, the vertical natural frequency can be measured in such a fashion that they lie well over the driving frequency of the unbalanced mass 40 or of the excitation shafts 40*a*40*d*. In a preferred embodiment, the elastomer discs are made of an elastomer of 90° Shore hardness, and possess a diameter of 62 mm at a height of 10 mm. With a load of 700 kg per bearing, a vertical stroke results of below 1 mm, whereby the natural frequency in the direction of the Z-axis, i.e., in the perpendicular, is 33 Hz. This value is clearly larger than the desired operating range of a driving frequency of 0–10 Hz.

These columns and/or this form of support for the vibrating table, in accordance with the invention, for circular vibration of the concrete to be compacted, have the advantage that they are moderate in price, and easy to assemble. The disadvantage is that lateral safety stops must be mounted.

The vibrating table, in accordance with the invention, allows circular vibration of the concrete to be compacted, without having this vibratory motion being disturbed by vertical vibration components.

What is claimed is:

1. A vibrating table for compacting a mass including:

a table top adapted to support the mass to be compacted;

support means for supporting said table top above a floor, said support means providing said table top with two degrees of freedom of movement in a substantially horizontal principal plane while substantially rigidly supporting said table top against movement in a direction generally perpendicular to said principal plane; and an excitation shaft coupled to said table top, said excitation shaft having an axis of rotation which is generally perpendicular to said principal plane and an unbalanced mass for the creation of an excitation force providing movement of said table top in said principal plane only.

2. The vibrating table of claim 1 wherein said table top includes a center of gravity and said excitation shaft is located generally vertically below said center of gravity.

3. The vibrating table of claim 1 wherein said support means comprises a support which permits movement of said table top substantially in a single plane.

4. The vibrating table of claim 3 including at least three said supports for supporting said table top.

5. The vibrating table of claim 3 including four said supports for supporting said table top, said supports being generally symmetrically arranged with respect to one another.

6. The vibrating table of claim 3 wherein said support includes a tension element.

7. The vibrating table of claim 6 wherein said tension element comprises a cable.

8. The vibrating table of claim 6 wherein said tension element comprises a rod.

9. The vibrating table of claim 1 wherein said support means comprises a mounting bracket extending downwardly from an underside of said table top, a girder member extending upwardly from the floor, and a tension member extending between said mounting bracket and said girder member.

10. The vibrating table of claim 9 wherein said mounting bracket is generally L-shaped and includes a first leg and a second leg extending generally transversely to said first leg, and said girder member is generally L-shaped and includes a first leg and a second leg extending generally transversely to said first leg, said second leg of said girder member being located between said second leg of said mounting bracket and said table top.

11. The vibrating table of claim 9 wherein said tension member comprises a cable.

12. The vibrating table of claim 9 wherein said tension member comprises a rod.

13. The vibrating table of claim 1 wherein said support means comprises a bearing.

14. The vibrating table of claim 1 wherein said support means comprises a ball bearing.

15. The vibrating table of claim 1 wherein said support means comprises a generally vertical column having a first end and a second end, and a first elastomeric member attached to said first end of said column, said column and said first elastomeric member being sufficiently compression resistant such that said table top and said excitation shaft possess a natural frequency in the vertical direction of greater than or equal to 25 Hertz.

16. The vibrating table of claim 15 wherein said column is formed from non-elastomeric materials, and a second elastomeric member is attached to said second end of said column.

17. The vibrating table of claim 1 including four excitation shafts coupled to said table top, said excitation shafts being arranged to provide symmetrical rotation relative to one another.

18. The vibrating table of claim 17 wherein said excitation shafts are driven by respective electrical motors.

19. The vibrating table of claim 18 wherein said electrical motors are electrically connected to a control such that one said motor operates as a master drive and the remaining motors operate as follower drives, wherein said control is programmable to produce different vibration patterns from the rotation of said excitation shafts.

20. The vibrating table of claim 19 wherein said control is programmable to rotate all of said unbalanced masses of said excitation shafts with the same phase angle to produce a generally circular vibratory motion.

21. The vibrating table of claim 20 including means for mechanically synchronizing said excitation shafts with one another.

* * * * *